Sept. 8, 1942.　　　W. T. HANSON, JR　　　2,294,981
COLOR CORRECTION
Filed May 25, 1940

BLUE-GREEN

MAGENTA

YELLOW

WESLEY T. HANSON, JR.
INVENTOR
BY
ATTORNEY

Patented Sept. 8, 1942

2,294,981

UNITED STATES PATENT OFFICE 2,294,981

COLOR CORRECTION

Wesley T. Hanson, Jr., Rochester, N. Y., assignor to Eastman Kodak Company, Rochester, N. Y., a corporation of New Jersey Application May 25, 1940, Serial No. 337,300

6 Claims. (Cl. 95—2)

This invention relates to color photography and particularly to duplicating or printing from colored originals.

It is an object of the invention to provide a method of color correction similar to the masking type to be used in duplicating a color transparency or print or making color separation negatives therefrom or in printing a color positive from a color negative. While modifications of the invention are applicable to each of these processes, it will be described with reference to the most useful form—namely, that in which a transparency or print is made from a transparency.

It is an object of the invention to provide a method of color correction in a process of color reproduction from an original which is made up of superimposed subtractive color images, i. e. yellow, magenta and blue-green images.

It is a particular object of the invention to provide a method of making a universal mask for such an original, i. e. a mask which when placed in register with the original acts to give all the correction of the masking type necessary. Color correction in color photography involves two general types; the one concerned here being that in which one color is corrected in accordance with the amount of the other colors present and the other type involving color balance depending on the separate response of the individual colors.

Specifically it is the object of the invention to provide a method of duplicating or printing from a multi-layer monopack, which method employs a universal mask to give color correction.

According to the invention a color correcting mask is made from and for a colored original of the type comprising superimposed subtractive color images by placing a sensitive layer in printing relation (i. e. contact or projection printing) to the original, exposing the layer to colored light from the original and developing the layer. After development the layer is in the usual masking manner placed in register with the original. The important feature of the invention is the use of colored printing light and the particular color of light selected. The color of the light must be that for which the relative absorptions of the coloring materials constituting the images are proportional to the relative amounts of correction required for those coloring materials. For example, the preferred embodiment of the invention employs a certain monochromatic light or light which is substantially monochromatic. In an original made up of superimposed yellow, magenta and blue-green layers there is usually no correction required for the yellow layer and, for example, equal amounts of correction may be required for the magenta and blue-green layers. Therefore, in this example, a monochromatic light is selected whose wave length is that which is substantially unabsorbed by the yellow coloring materials and is substantially equally absorbed by the magenta and blue-green coloring materials. If it is desired to give twice as much correction for the blue-green layer as for the magenta layer, a wave length is selected at which the absorption (in density units) of the blue-green dye or other blue-green coloring material is twice that of the magenta dye.

A satisfactory theory of the masking type of color correction and of the application of the present invention to the selection of the color of the printing light for a universal mask is as follows. Assuming that a facsimile of the original is wanted; ipso facto there are no errors in the appearance of the original (factors constraining this assumption need not be considered). Therefore, a mask corrects only for any errors in the reproduction process, e. g. in the reproduction materials, which depend on the color being reproduced. Thus the amount of correction depends on the color (hue, saturation and brightness) of the original but this is not considered to be an error in the original. By prior art methods one may for any particular reproduction process determine the amounts of correction required by that process when reproducing red, orange or any other specified color. These "amounts" are different "for" each color and one speaks for example of the "amounts of correction for" magenta, yellow and blue-green, without any reference to errors in these colors.

Usually no correction is required for yellow. If the ratio of the amounts of correction for magenta and blue-green is $x$ say, then the present invention says that a universal mask should be exposed by substantially monochromatic light at which the ratio of the densities of magenta and blue-green (effectively equal amounts of each of course) in the original is $x$. The reason why this gives the best possible universal mask is not fully explained especially since universal masks necessarily involve approximations in theory. But explained or not, the ratio of the densities of the layers to the exposing light should equal the ratio of the amounts of corrections for the layers and the amount of correction for a layer (measurable for example in terms of the gamma of a mask required individually for that layer) depends on the color of the layer.

Other objects and advantages of the invention and the invention itself will be more fully understood from the following description when read in connection with the accompanying drawing in which:

Figs. 1, 2, and 3 illustrate transmission curves for typical blue-green, magenta and yellow dyes respectively.

Figure 1:
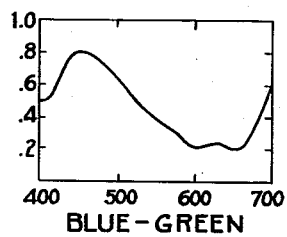
Figure 2:
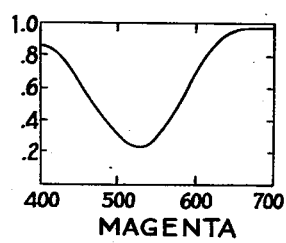
Figure 3:
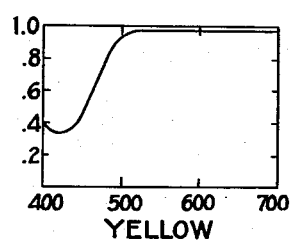

In Figs. 1, 2, and 3, transmission of a dye is plotted against wave lengths. The blue-green dye transmits best in the blue-green region and absorbs red. The fact that the blue-green dye used in the reproduction process does not transmit blue-green perfectly constitutes one of the deficiencies to be corrected by a masking method of color correction. The magenta dye transmits the red and blue regions and absorbs green; the transmission in the blue regions is far from perfect. The yellow dye used in the reproduction process transmits almost perfectly in the green and red regions and the reproduction of yellow is generally considered entirely satisfactory without correction.

Figure 4:
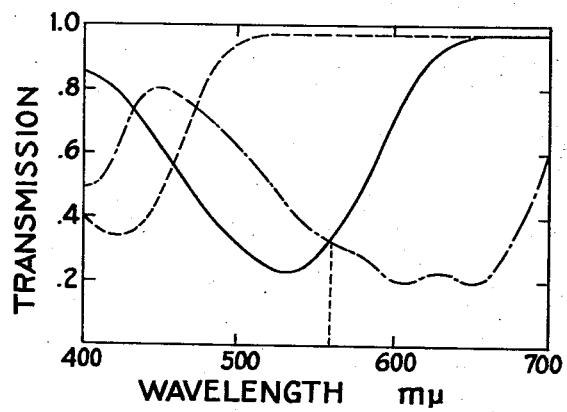
Fig. 4 shows these transmission curves superimposed.
Figure 5:
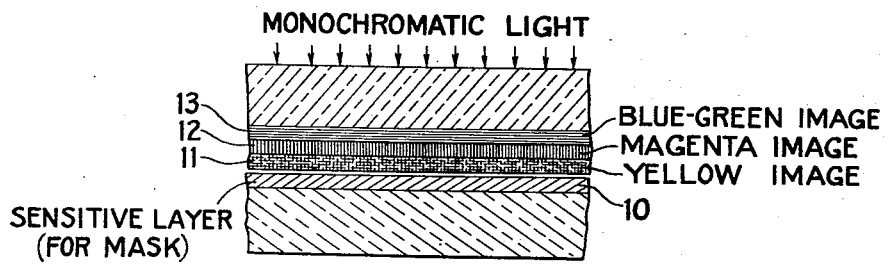
Fig. 5 illustrates one embodiment of the invention.

In Fig. 4 the three transmission curves of Figs. 1, 2, and 3 are shown superimposed. If substantially equal amounts of correction are required for the magenta and blue-green images, according to the invention I select a wave length of about 560 millimicrons as a printing light for making a mask as illustrated in Fig. 5. At this particular wave length indicated by a broken line, the transmission of the yellow dye is almost perfect and hence the light striking the sensitive layer 10 is reduced only by the images appearing in the magenta and blue-green layers 12 and 13. Of course, the actual absorption of light at any point in any layer in the original depends on the density of the image at that point as well as on the spectral transmission of the dye constituting that image. The density of the image determines the quantity of the correction as in any masking process and in accordance with the present invention, the variations in spectral transmission of the dye are used to control the quality (i. e. the type) of correction.

This layer 10 after exposure is processed preferably to a monochrome image such as a silver image and again placed in register with the colored original comprising layers 11, 12, and 13, and is used in that position during printing, i. e. during duplicating, making a paper print or making separation negatives if the original is a positve (or during the making of a positive if the original is a negative). In the example here described a duplicate or paper print is to be made from an original positive transparency.

The actual printing light need not be purely monochromatic. For example, if equal amounts of correction for the magenta and blue-green dves are required the printing light could be between 550 and 570 millimicrons and still be approximately equally affected by the two images. The light from 550 to 560 millimicrons would be more absorbed by the magenta layer than by the blue-green layer, but the light from 560 to 570 would, on the other hand, be more absorbed by the blue-green layer than by the magenta layer. In fact substantially equal effects are obtained by a relatively broad band extending from 510 millimicrons to 600 millimicrons in which region the transmission of the yellow dye is practically perfect. On the other hand, the use of monochromatic light or of bands such as mentioned above, at most 20 millimicrons wide, is preferable since it permits very exact and easy control of the relative amounts of correction obtained.

The amount of correction and the relative amounts of correction required depend of course on the dyes used. In the example shown, a mask printed with a monochromatic light of 600 millimicrons gives about five times as much correction for the blue-green image as for the magenta image since, at this wave length, the density of the blue-green dye is about five times that of the magenta dye, the density (.02) of the yellow dye being subtracted in each case before the ratio is taken. Density equals log 1/$T$ where $T$ is the transmission. A printing light whose wave length is between 500 and 560 millimicrons would give more correction for the magenta than for the blue-green image of the same gray scale density.

Various methods of obtaining the effect of monochromatic light may be employed. I have found it desirable when the reproduction process employs dyes having approximately the same curves as shown in Fig. 4 to give about three times as much correction for the blue-green dye as for the magenta dye. The 589.0 and 589.6 millimicron lines of the sodium spectrum can be used to get just the effect desired. However, I prefer to use a tungsten source with filters. Using a panchromatic emulsion with its sensitivity cutting off at about 640 millimicrons and filters such as a combination of Wratten #23 and Wratten #56, the region from 570 to 620 millimicrons is effective and produces satisfactory results. Alternatively an emulsion peculiarly sensitive to this region can be used with some filter such as Wratten #22 for cutting off the normal blue sensitivity. Since the sensitivity of the emulsion used is obviously an important factor, the term "exposing" used in this specification and claims has only the reasonable meaning excluding the case where light strikes the film without affecting it. That is a film is not "exposed" by light to which it is insensitive even if such light strikes the film.

Thus in this case whatever source of substantially monochromatic light is used, its color or wavelength band must be that for which the magenta and blue-green dyes have densities approximately in the ratio 1:3.

Having thus described the preferred embodiment of my invention, I wish to point out that it is not limited to this specific example, but is of the scope of the appended claims.

What I claim and desire to secure by Letters Patent of the United States is:

1. In the process of making a color correcting universal mask from and for register with a colored original made up of superimposed subtractive color images, when reproducing the original by a process requiring fixed amounts of correction for the color of each of said images, the steps of exposing a sensitive layer through the original by substantially monochromatic light whose wave length is that at which the relative absorptions of the coloring materials constituting said images are proportional to the relative amounts of correction required for these images and developing the layer to the correcting gamma corresponding to the undesired absorptions.

2. In the process of making a color correcting universal mask from and for register with a colored original made up of superimposed images made of yellow, magenta and blue-green coloring materials when reproducing the original by a process requiring fixed amounts of correction for the color of each of said materials, the steps of exposing a sensitive layer through the original to substantially mono-chromatic light whose wave length is that at which the magenta and blue-green coloring materials absorb in relative proportion to the relative amounts of correction required for these coloring materials and developing the layer to the correcting gamma corresponding to the undesired absorptions.

3. In a process for reproducing a colored original made up of superimposed images made of subtractive color coloring materials, which process requires fixed amounts of correction for the color of each of said materials, the method of making a color correcting universal mask from and for said original, comprising placing a sensitive layer in printing relation to the original, exposing the layer to substantially monochromatic colored light from the original, the color of the light being that at which the relative absorptions of the coloring materials are proportional to the relative amounts of correction required for those coloring materials, developing the layer to the gamma required for color correction and placing the developed layer in register with the colored original.

4. In a process for reproducing a colored original made up of superimposed images made of subtractive color coloring materials, which process requires fixed amounts of correction for the color of each of said materials, the method of making a color correcting universal mask from and for said original, comprising placing a sensitive layer in printing relation to the original, exposing the layer to monochromatic light from the original, the wave length of the light being that at which the relative absorptions of the coloring materials are proportional to the relative amounts of correction required for those coloring materials, developing the layer to the gamma required for color correction and placing the developed layer in register with the colored original.

5. In a process for reproducing a colored original made up of superimposed images made of yellow, magenta and blue-green dyes which process required fixed amounts of correction for the color of each of the dyes, the method of making a color correcting universal mask from and for said original, comprising placing a sensitive layer in printing relation to the original, exposing the layer to substantially monochromatic colored light from the original, the color being that for which the relative absorptions of the magenta and blue-green dyes are proportional to the relative amounts of correction required for those dyes and for which the absorption of the yellow dye is practically zero, developing the layer to the gamma required for color correction and placing the developed layer in register with the colored original.

6. In a process for reproducing a colored original made up of superimposed images made of yellow, magenta and blue-green dyes which process required fixed amounts of correction for the color of each of the dyes, the method of making a color correcting universal mask from and for said original, comprising placing a sensitive layer in contact with the original, exposing the layer through the original to substantially monochromatic colored light whose wave length substantially is that at which the densities of the magenta and blue-green dyes are approximately in the ratio 1:3 and the yellow dye has practically zero absorption, developing the layer to the gamma required for color correction and placing the developed layer in register with the colored original.

WESLEY T. HANSON, JR.